(12) United States Patent
Jang

(10) Patent No.: US 6,263,469 B1
(45) Date of Patent: Jul. 17, 2001

(54) METHODS AND SYSTEMS FOR ACCESSING DATA FROM A DVD USING A SYNC DETECTOR INCLUDING A 26 STATE FINITE STATE MACHINE

(75) Inventor: Eric Jang, Cupertino, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/177,450

(22) Filed: Oct. 22, 1998

(51) Int. Cl.[7] .................................................. H03M 13/00
(52) U.S. Cl. ...................... 714/775; 369/47.28; 360/51; 386/126; 717/747
(58) Field of Search .................................. 369/47, 47.28, 369/47.16, 53.34; 360/51; 714/775, 747; 386/126

(56) References Cited

U.S. PATENT DOCUMENTS

| | | | |
|---|---|---|---|
| 5,363,360 | * 11/1994 | Fairchild | 369/480 R |
| 5,508,985 | * 4/1996 | Fairchild | 369/480 R |
| 5,931,921 | * 8/1999 | Kyle | 710/29 |
| 6,061,655 | * 5/2000 | Xue et al. | 704/500 OR |
| 6,081,783 | * 6/2000 | Divine et al. | 704/500 OR |
| 6,098,044 | * 8/2000 | Huang | 369/59 X |
| 6,173,430 | * 1/2001 | Massoudi | 714/775 |

* cited by examiner

Primary Examiner—Aristotelis M. Psitos
(74) Attorney, Agent, or Firm—Young Law Firm, P.C.

(57) ABSTRACT

An apparatus and a method to access data from a digital recording medium configured to store data in sectors delimited by a predetermined sequence of sync patterns. The apparatus includes a sync pattern detector and a sync sequence detector to detect whether a sequence of sync patterns detected by the sync pattern detector matches the predetermined sync pattern sequence. The sync sequence detector generates a sync error signal whenever a detected sync pattern fails to match an expected sync pattern taken from the predetermined sync pattern sequence. A sync error signal counter counts the number of sync error signals generated by the sync sequence detector and a comparator compares the number of sync error signals counted by the sync error signal counter with a sync error threshold, the comparator generating a disk error signal when the threshold is exceeded. As the method and the implementing device need not rely upon the successful detection of any one sync pattern in the sector including the first sync pattern of the sector, data accesses may be carried out even though the first or a predetermined number of subsequent sync patterns in the sector may be unreadable or corrupted.

17 Claims, 5 Drawing Sheets

METHODS AND SYSTEMS FOR ACCESSING DATA FROM A DVD USING A SYNC DETECTOR INCLUDING A 26 STATE FINITE STATE MACHINE

BACKGROUND OF THE INVENTION

1. Field of the Invention

This invention relates to the field of Digital Versatile Disks, or DVD. More particularly, the present invention relates to methods and apparatuses for reducing the data access time from a digital storage medium, such as a DVD Read Only Memory (hereafter, DVD-ROM) or a recordable DVD (hereafter referred to generically as DVD-Random Access Memory or DVD-RAM).

2. Description of the Related Art

A sector in a DVD is variously called a data sector, a recording sector or a physical sector, depending upon its configuration. FIG. 1 shows a data sector of a DVD disk. As shown in FIG. 1, a data sector includes 2048 bits of data, 4 bytes of identification (ID) data; 2 bytes of ID Error Detection code (IED), 6 bytes of Copyright Management Information (CPR MAI) and 4 bytes of Error Detection Code (EDC). The 2048 bytes of data are then scrambled, using a feedback shift register. An ECC block is made up of 16 of the data sectors shown in FIG. 1. The 16 data sectors of the ECC block are then encoded, using Cross-Interleaved Reed-Solomon Code (CIRSC). An ECC block, including outer code parity (PO) and inner code parity (PI), is shown in FIG. 2. As shown in FIG. 2, 10 bytes of PI are added after each row, and one row of 182 bytes of PO are added after each of the 16 data sector of the ECC block, for a total of 16 rows of 182 bytes of PO data.

A recording sector is formed by interleaving the PO data in each of the 16 data sectors. One such recording sector is shown in FIG. 3. Each recording sector, therefore, includes a data sector consisting of 12 rows of 172 bites, each row having 10 bytes of PI data appended thereto. One row of 182 bytes of PO data is also included, as a result of the interleaving process referred to above.

Finally, a physical sector, according to the DVD specification, is formed by a two step process. First, an 8:16 modulation conversion is carried out, which effectively doubles the width of each sector. Then, 32 bits of frame synchronization information are prepended to each of the recording sectors in each row. A physical sector is shown in FIG. 4. As shown therein, each Sync Frame includes 4 bytes of synchronization information, each indicating the start of a recording sector, each recording sector consisting of 1456 bits, or 172 bytes of data and 10 bytes of PI information. Each synchronization code (hereafter"sync pattern" ) SYN0 to SYN7 is selected according to sync tables, not shown.

To access (e.g., to read or write) data from a DVD-ROM or DVD-RAM, a DVD read or read/write device must find the beginning of each physical sector. As shown in FIG. 4, only a single SYN0 bit pattern is included in each physical sector. To find the beginning of a physical sector, therefore, requires the DVD device to find the SYN0 bit pattern. It however, the disk has been somehow damaged or random noise has prevented the device from identifying the SYN0 pattern, the DVD-ROM/RAM device may be unable to locate the SYN0 bit pattern and thus will not be able to identify the beginning of a physical sector. The DVD device must then backtrack and attempt to read the physical sector again, by again attempting to detect the singular SYN0 bit pattern marking the beginning of each physical sector. This procedure may be repeated for a predetermined number of attempts before the SYN0 bit pattern is detected. Each time, the DVD-ROM/RAM device must traverse all 38,688 channel bits of the physical sector before backtracking to attempt detection of the SYN0 pattern again. This repeated traversal of the physical sector and repeated scan for the unique and singular SYN0 pattern necessarily increases the data access time of such DVD ROM/RAM devices. Moreover, if the disk is damaged and the SYN0 bit pattern is unreadable, the physical sector including the damaged SYN0 pattern will be unreadable, potentially rendering the data or program stored on the DVD-RAM or ROM inaccessible and the disk useless.

What are needed, therefore, are devices and methods to reduce the access time of data from DVD-ROM and DVD-RAM disks. What are also needed are devices and methods to reduce the data access time of DVD-ROM and DVD-RAM disks, as well as methods and devices that are tolerant of some manufacturing defects and/or to the effects random noise, particularly in the disk areas reserved for the physical sector synchronization patterns.

SUMMARY OF THE INVENTION

The principles of the present invention provide for devices and methods to reduce the access time of data from DVD-ROM and DVD-RAM disks. The principles of the present invention also provide for devices and methods to reduce the data access time of DVD-ROM and DVD-RAM that are tolerant of some manufacturing defects and/or to the effects random noise, particularly in the disk areas reserved for the physical sector synchronization patterns.

In accordance with the principles of the present invention and those that will be mentioned and will become apparent below, a method of accessing data from a digital storage medium configured to store data in sectors delimited by a predetermined sequence of sync patterns, comprises the steps of:

detecting a sync pattern within a sector of the storage medium;

determining whether the detected sync pattern matches an expected sync pattern;

generating a sync error signal when the detected sync pattern does not match the expected sync pattern;

returning to the detecting step as long as a number of sync error signals does not exceed a predetermined threshold.

According to other embodiments, the predetermined threshold may be programmable. A step of incrementing a sync error counter each time the sync error signal is generated may also be carried out. A step of resetting the sync error counter when the determining step determines that all detected sync patterns within the sector match the expected sync pattern may also be carried out. The method of the invention may include a step of resetting the sync error counter when the number of sync error signals generated exceeds the predetermined threshold. The method may also include the step of resetting the sync error counter when a sync pattern indicative of a beginning of a sector is detected. A step of generating an disk error signal when the number of sync error signals exceeds the predetermined threshold may also be carried out. A step of storing an ordered sequence of sync patterns corresponding to the sync patterns of a sector may also be carried out, each expected sync pattern being read in turn from the stored ordered sequence. The sector may be physical sector and the digital storage medium may be a DVD.

The present invention may also be viewed as an apparatus to access data from a digital recording medium configured to store data in sectors delimited by a predetermined sequence of sync patterns, comprising:

a sync pattern detector;

a sync sequence detector to detect whether a sequence of sync patterns detected by the sync pattern detector matches the predetermined sync pattern sequence, the sync sequence: detector generating a sync error signal whenever a detected sync pattern fails to match an expected sync pattern taken from the predetermined sync pattern sequence;

a sync error signal counter to count a number of sync error signals generated by the sync sequence detector, and a comparator to compare a number of sync error signals counted by the sync error signal counter with a sync error threshold, the comparator generating a disk error signal when the threshold is exceeded.

According to other embodiments of the invention, the sync sequence detector may include a finite state machine. The finite state machine may be an X-state finite state machine, wherein X is the number of sync patterns in the predetermined sequence of sync patterns. The digital recording medium may be a DVD and the finite state machine may be a 26-state finite state machine. A logic circuit may be coupled to the sync sequence generator and/or the sync signal error counter, the logic circuit generating a sync error signal counter reset signal. The logic circuit may implement an OR logical function. The sync error threshold may be programmable by a sync error threshold signal input to the comparator.

The present invention may also be viewed as a DVD controller, comprising:

means for detecting sync patterns from a data stream read from a DVD device;

means for comparing each detected sync pattern with a corresponding expected sync pattern taken in turn from a predetermined sequence of sync patterns within a physical sector of a DVD;

means for generating a sync error signal whenever the detected and expected sync patterns fail to match; and means for generating a disk error signal when a predetermined number of sync error signals have been generated.

The disk error signal may include an interrupt signal. The generating means may include a sync error signal comparator means for comparing a number of sync error signal generated with the predetermined number. The comparing means may include a 26 state Finite State Machine. The disk error signal generating means may generate a disk error signal whenever a preset number of consecutive sync error signals have been generated.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 1:
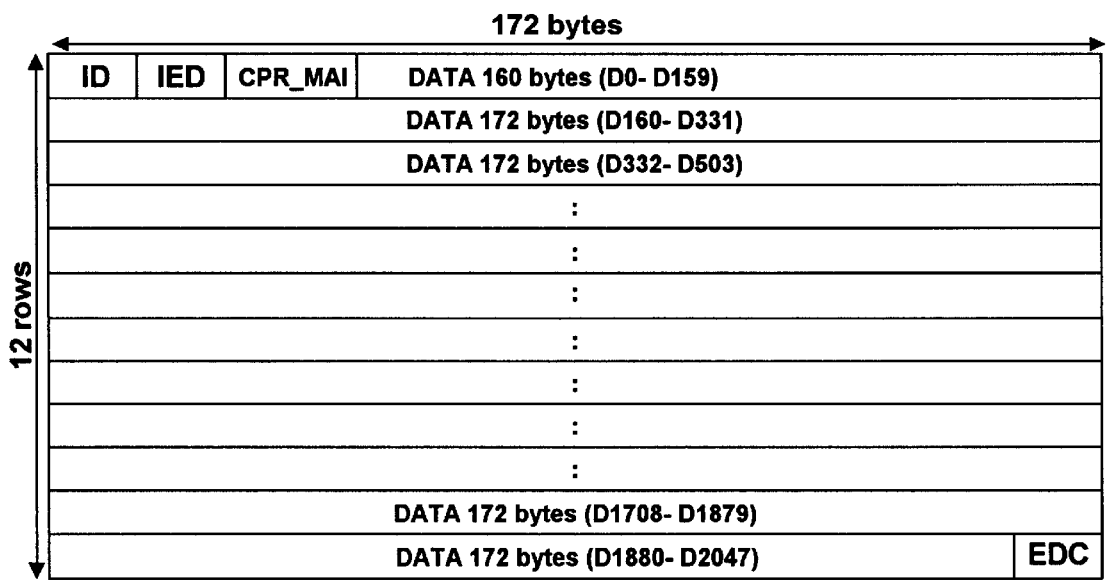
FIG. 1 shows the logical configuration of a data sector of a DVD-ROM or DVD-RAM disk.
Figure 2:
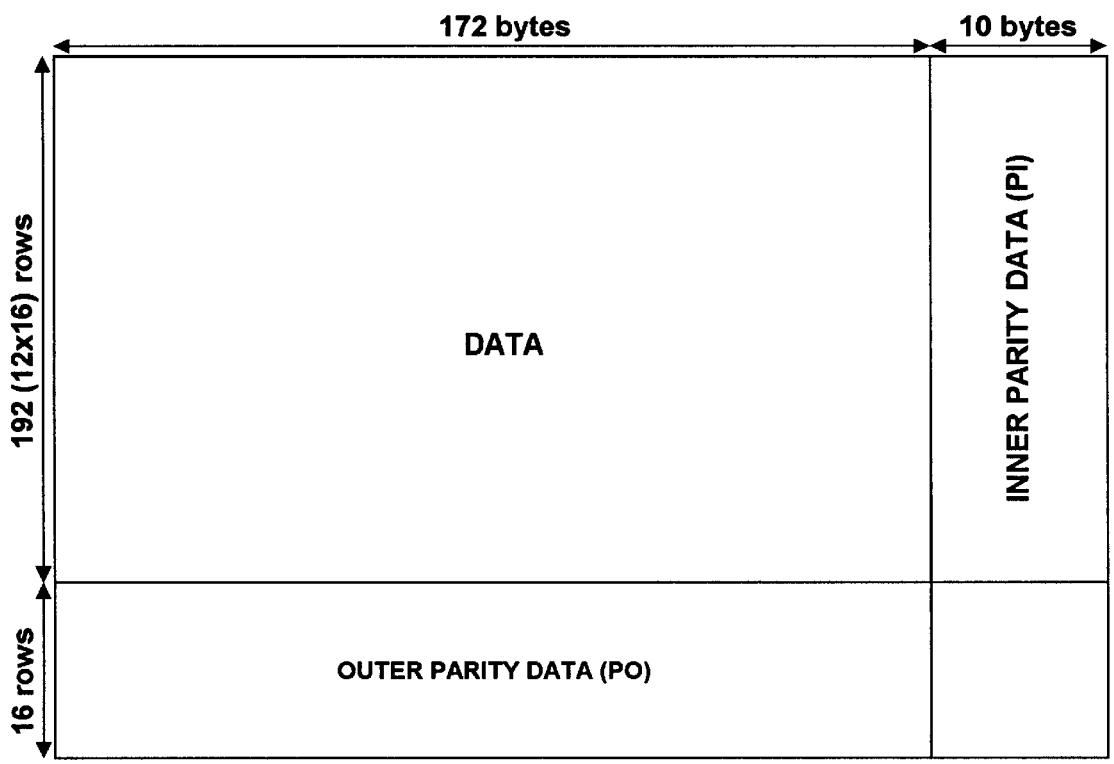
FIG. 2 shows the logical configuration of an ECC block, including outer code parity (PO) and inner code parity (PI).
Figure 3:
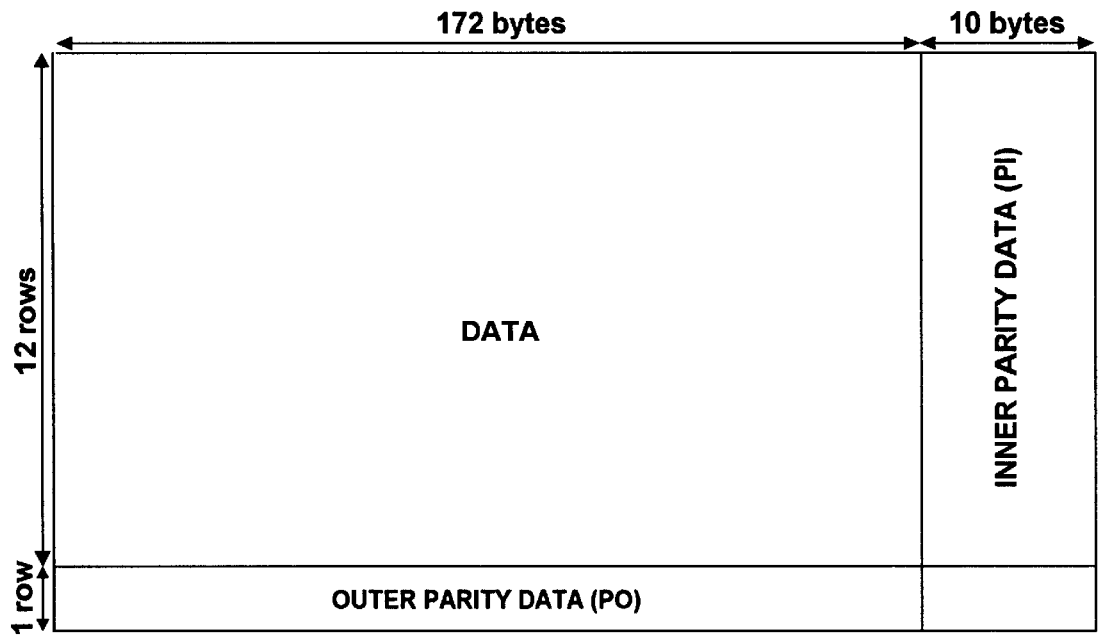
FIG. 3 shows the logical configuration of a recording sector of a DVD-ROM or DVD-RAM disk.
Figure 4:
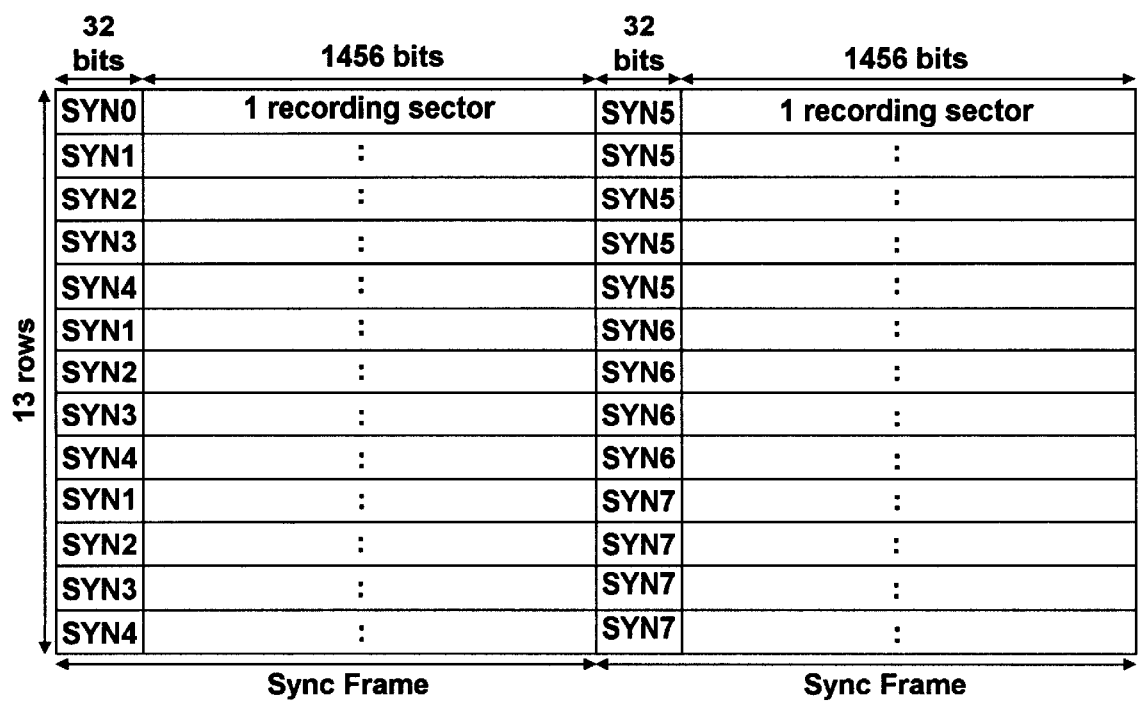
FIG. 4 shows the logical configuration of a physical sector, consisting of two Sync Franies, of a DVD-ROM or DVD-RAM disk.
Figure 5:
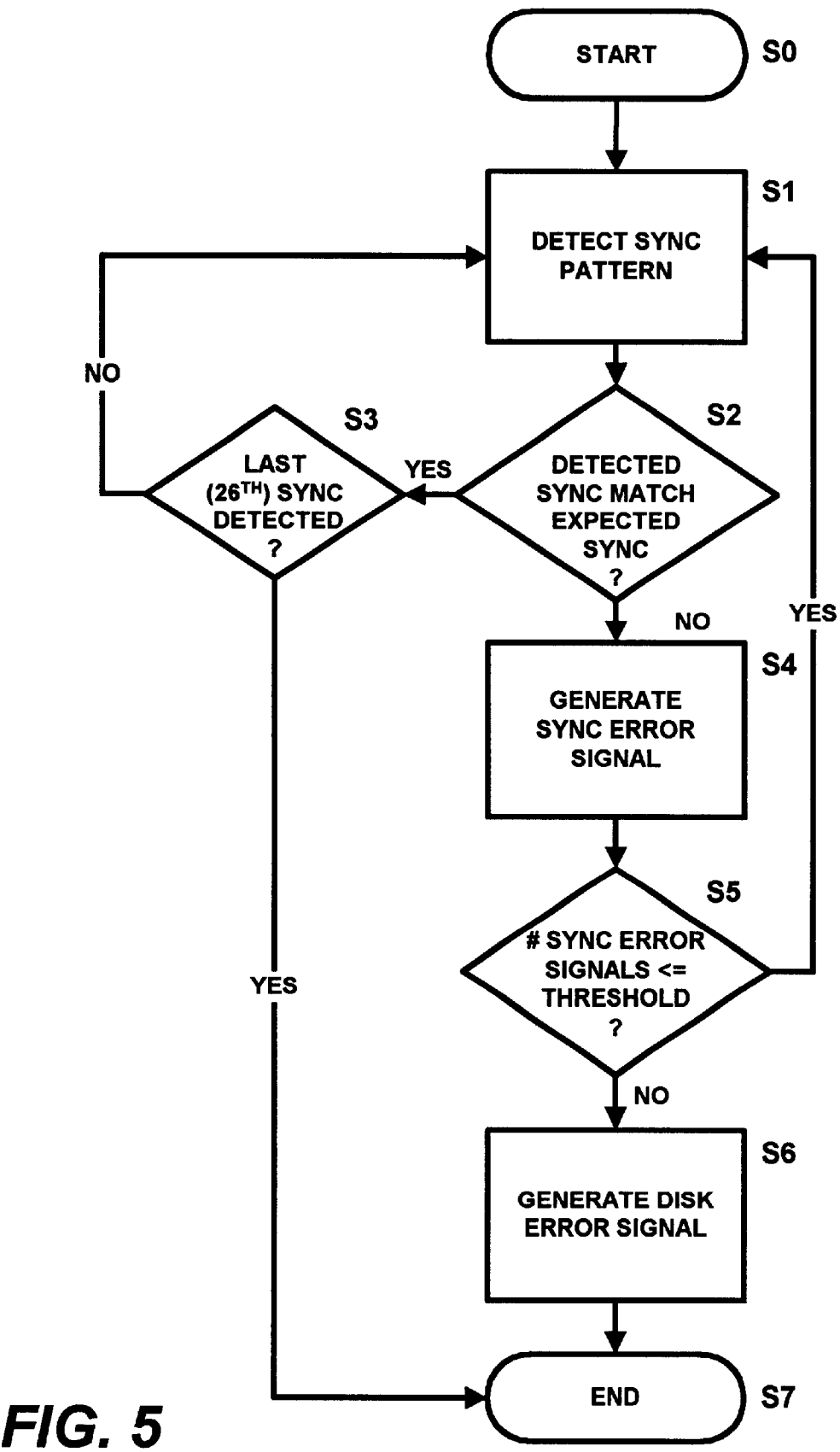
FIG. 5 is a flow diagram illustrating an embodiment of the method according to the present invention.

FIG. 5 is a flow diagram illustrating an embodiment of the method of reducing the access time of a DVD according to the present invention. The method begins at step S0. At step S1, the bit stream read from the DVD is read, and detection of the sync patterns SYN0, SYN1, SYN2, SYN3, SYN4, SYN5, SYN6 or SYN7 (shown in FIG. 4) is attempted. If the read/write head of the DVD device has been properly positioned at the beginning of a physical sector (shown in FIG. 4), the first sync pattern read will be SYN0, there being only one such SYN0 sync pattern per physical sector, located at the beginning of the physical sector, is shown in FIG. 4. In step S2, the sync pattern detected in step S1 is compared with an expected sync pattern. The expected sync pattern is taken (e.g., read) from a pre-stored ordered sequence of sync patterns corresponding to the sync patterns of a physical sector of a DVD. For example, with reference to FIG. 4, the pre-stored sequence of sync patterns is preferably identical to the sequence of sync patterns in a physical sector. For example, the pre-stored sequence of sync patterns may be the following sequence of 26 sync patterns: SYN0, SYN5, SYN1, SYN5, SYN2, SYN5, SYN3, SYN5, SYN4, SYN5, SYN1, SYN6, SYN2, SYN6, SYN3, SYN6, SYN4, SYN6, SYN1, SYN7, SYN2, SYN7, SYN3, SYN7, SYN4 and SYN7.

In step S3, if the detected sync pattern does indeed match the expected sync pattern, it is determined whether the last ($26^{th}$) sync pattern has been detected, marking the end of the current physical sector of the DVD. If the last detected sync pattern is not the $26^{th}$ sync pattern, the method according to the present invention returns to step S1. However, the last detected sync pattern may not match the currently expected sync pattern, for a variety of reasons. For example, random noise may have prevented the DVD device from correctly accessing the current sync pattern. Alternatively, the DVD may include a corrupted sector or be damaged in some manner. If, therefore, the last detected sync pattern does not match the expected sync pattern, a sync error signal is generated in step S4.

In step S5, it is determined whether the number of sync error signals generated thus far is equal to (or exceeds) a predetermined threshold number of such sync error signals per physical sector. According to the present invention, this threshold number may be programmable. If the number of sync error signals generated thus far does not exceed (or is not equal to or greater than) the predetermined threshold number, then the method according to the present invention returns to step S1, to detect the next sync pattern from the bit stream read from the DVD. However, if the number of sync error signals generated thus far exceeds (or is equal to) the predetermined number, then a disk error signal is generated, as shown in step S6. The disk error signal may alert the DVD device that the current DVD in the device or drive may be unreadable. The disk error signal generated in step S6 may be an interrupt signal to the system, causing a predetermined action (e.g., an interrupt handling routine) to execute. The method ends at step S7.

Figure 6:
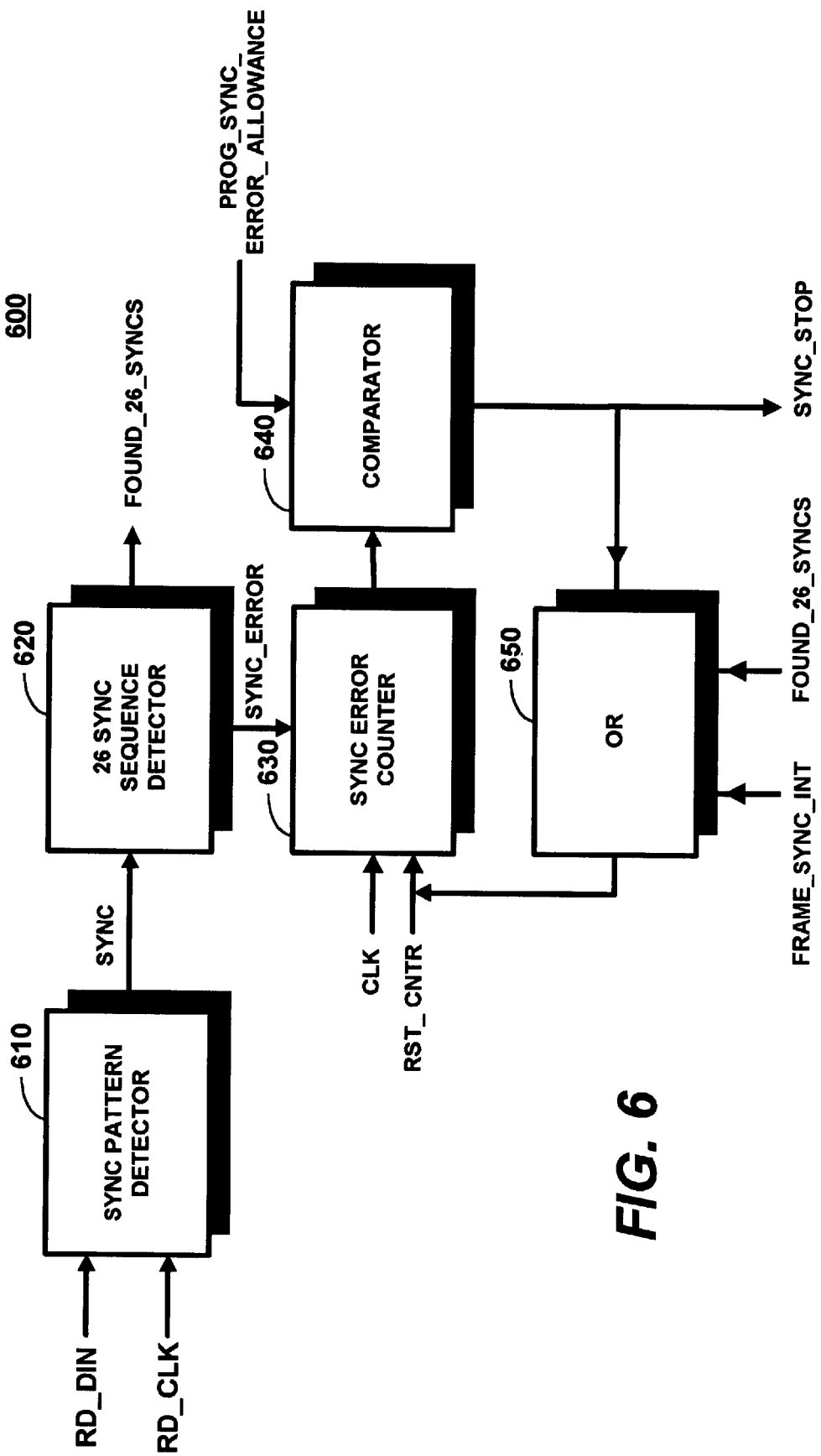
FIG. 6 is a block diagram of an embodiment of the device according to the present invention.

FIG. 6 shows an embodiment of a device 600 to reduce access time of DVD-RAM or DVD-ROM according to the present invention. The Sync Pattern Detector 610 takes a read clock signal RD_CLK from a read clock (not shown) and a 4 bit programmable width bus signal RD_DIN from the output of the read channel processor (not shown) of the DVD device. To generate the RD_DIN signal, the DVD-ROM or RAM is read by four laser diodes and processed by a read channel processor within the DVD device. The processed bitstream presented to the Sync Pattern Detector 610 is synchronous with the read clock signal RD_CLK and may be a 1, 2 or 4 bits in width. In Single-Bit-Mode, only one of the 4 bits of the RD DIN signal is valid and the RD CIL signal has a frequency of 26.16 MHz. In Dual-Bit-Mode, two of the four RD-DIN bits are valid, and the frequency of the RD_CLK signal is 52.32 MHz. In Quad-Bit-Mode, all four bits of the RD_DIN signal are valid and the frequency of the RD CLK signal is 104.64 MHz.

The RD_CLK and RD DIN signals are input to the Sync Pattern Detector 610. The Sync Pattern Detector 610 detects the presence of any one of the eight sync patterns SYN0 to SYN7. The SYNC signal output from the Sync Pattern Detector 610 is a signal identifying which of the eight sync patterns SYN0 to SYN7 was detected in the bitstream read from the DVD-ROM or DVD-RAM. The 26 Sync Sequence Detector 620 receives the SYNC signal from the Sync Pattern Detector 610 and compares the SYNC signal with the currently expected SYN0 to SYN7 bit sequence. The currently expected sync sequence may be read from a pre-stored and ordered sequence of sync patterns in a DVD physical sector. For example, the 26 Sync Sequence Detector 620 may store the following sequence of sync patterns: SYN0, SYN5, SYN1, SYN5, SYN2, SYN5, SYN3, SYN5, SYN4, SYN5, SYN1, SYN6, SYN2, SYN6, SYN3, SYN6, SYN4, SYN6, SYN1, SYN7, SYN2, SYN7, SYN3, SYN7, SYN4 and SYN7, which is the sequence of sync patterns of a physical sector of a DVD, as shown in FIG. 4. If each of the 26 detected sync patterns of the current physical sector matches the expected sync pattern, the 26 Sync Sequence Detector 620 asserts the FOUND_26_SYNCS signal, indicating successful detection and matching of each of the 26 sync patterns of the current physical sector. On the other hand, each time the detected sync pattern fails to match the currently expected sync pattern, the 26 Sync Sequence Detector 620 generates a SYNC_ERROR signal. The SYNC ERROR signal is then input to the Sync Error Counter 630. The value within the Sync Error Counter 630 is incremented each time the SYNC_ERROR signal is asserted while the clock signal CLK is asserted.

The value within the Sync Error Counter 630 is then input to Comparator 640, which compares this value with a predetermined threshold value. The threshold value is preferably programmable, via the PROG_SYNC_ERROR_ALLOWANCE signal. If the number of SYNC_ERROR signals counted by the Sync Error Counter 630 is equal to (or greater) than the predetermined threshold value, then Comparator 640 outputs a SYNC_STOP signal, indicative that current physical sector may be unreadable or that the DVD may be corrupted or somehow damaged. The SYNC_STOP signal may be an interrupt signal causing a predetermined action (e.g., interrupt handling routine) to execute. The SYNC_STOP signal is also input to a logic circuit 650. The logic circuit 650 may, for example, implement the logical OR function. The output of the logical circuit 650 is tied to the counter reset signal RST_CNTR input to the Sync Error Counter 630. The Sync Error Counter 630 will be reset when the Comparator 640 determines that the number of SYNC_ERROR signals is equal to (or greater) than the predetermined and programmable threshold value. Alternatively, assertion of the FOUND_26_SYNCS signal from the 26 Sync Sequence Detector 620 will also cause the Sync Error Counter 630 to reset, so the Sync Error Counter 630 may be reset for the next physical sector. The Sync Error Counter, however, should also be reset at the beginning of each ECC block, and assertion of the FRAME_SYNC_INT signal also causes the Sync Error Counter 630 to reset.

The device to reduce the access time of a DVD-ROM or DVD-RAM shown in FIG. 6, therefore, is tolerant of an unreadable SYN0 sync pattern and also tolerant of a programmable number of other unreadable sync patterns within a physical sector. Indeed, as long as the number of SYNC_ERROR signals generated in a physical sector does not exceed the predetermined and programmable threshold value in the Comparator 640, the DVD device may continue to access the current physical sector. Thus, there is no need to traverse the entire physical sector and attempt to read the SYN0 sync pattern indicative of the start of the first recording sector within current physical sector data to successfully access, read and write to a physical sector of a DVD.

In an alternative embodiment, the Sync Error Counter 630 may also count the number of consecutive SYNC_ERROR signals that are generated by the 26 Sync Sequence Detector 620. The number of consecutive SYNC_ERROR signals may then be input to the Comparator 640 for comparison with a predetermined consecutive threshold value. This consecutive threshold value may also be programmable. In such an embodiment, the Comparator 640 may generate a SYNC_STOP signal whenever either one of two events, occurs. Indeed, the first event may be that the total number of SYNC_ERROR signal is equal to (or exceeds) a predetermined threshold value, as described above. The second event that may cause the assertion of the SYNC_STOP signal (and subsequent resetting of the Sync Error Counter 630) may be that the predetermined and programmable consecutive threshold value has been met (or has been exceeded). Alternatively still, combinations of these two events are possible, to cause the SYNC_STOP signal to be asserted according to some formula interrelating the total number of SYN_ERROR signals generated with the number of consecutive SYNC_ERROR signals generated. Other variations will no doubt occur to those of skill in this art, and all such variations should be deemed to fall within the scope of the present invention.

Figure 7:
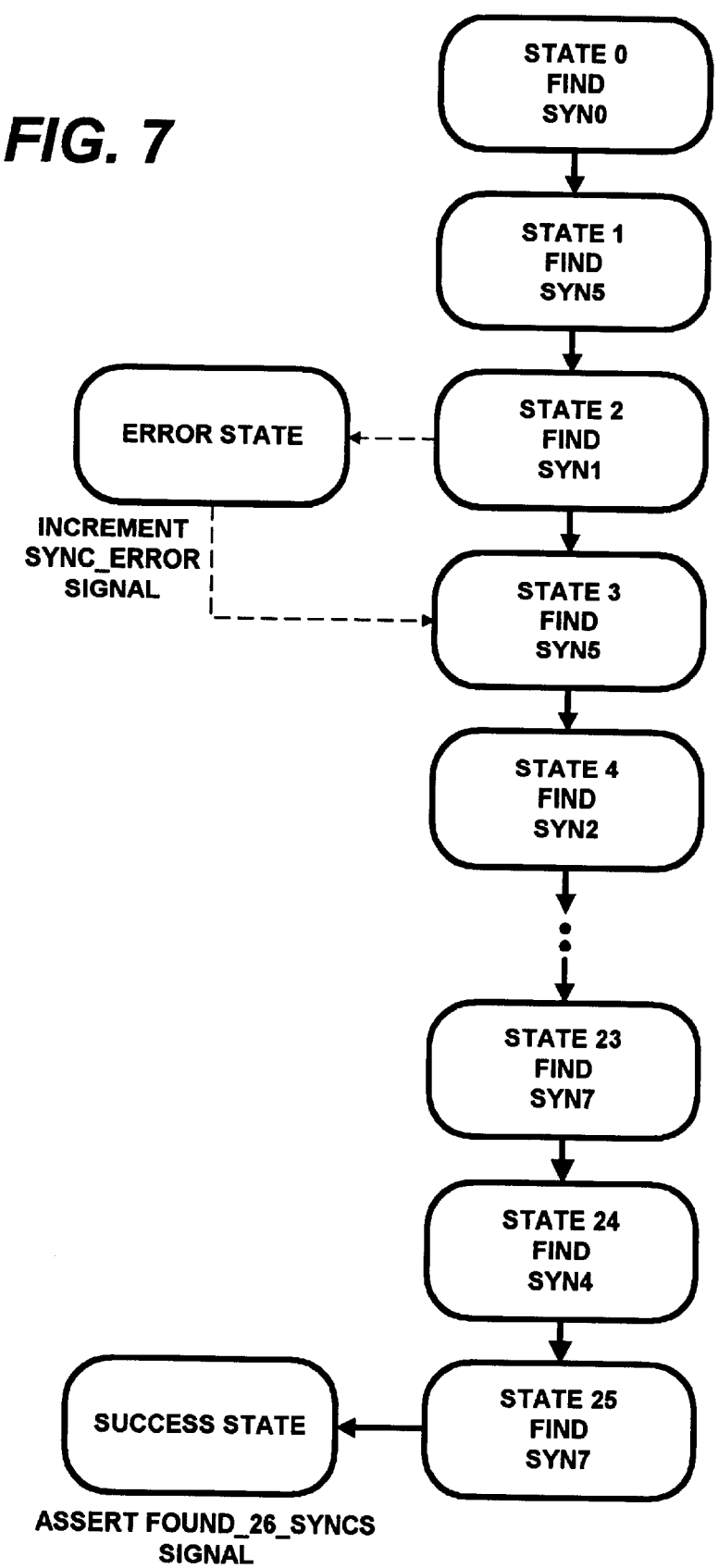
FIG. 7 is a diagram of a 26-state machine according to an embodiment of the present invention.

The 26 Sync Sequence Detector 620 may be viewed as a finite state machine having 26 states, as shown in FIG. 7. As shown in FIG. 7, each state is identified by the numerals 0 through 25, one for each of the 26 sync patterns of a physical sector SYN0, SYN5, SYN1, SYN5, SYN2, SYN5, SYN3, SYN5, SYN4, SYN5, SYN1, SYN6, SYN2, SYN6, SYN3, SYN6, SYN4, SYN6, SYN1, SYN7, SYN2, SYN7, SYN3, SYN7, SYN4 and SYN7, as shown in FIG. 4. Whenever a sync pattern is not found within one of the 26 states, the state machine assumes an error state, in which a SYNC_ERROR signal (FIG. 6) is generated, to cause the Sync Error Counter 630 to increment. Upon finding each of the 26 sync patterns in the correct order, the state machine assumes a success state, wherein the FOUND_26_SYNCS signal is asserted.

The present invention is finds utility in reducing the access time of DVD-ROM and DVD-RAM. However, the present invention is also readily applicable to any digital storage medium configured to store data in sectors delimited by a predetermined sequence of sync patterns. The present invention may be implemented alone, or together with the devices and methods disclosed in the co-pending and commonly assigned U.S. patent application entitled "Improved DVD Bit Stream Counter/Sync Method and Apparatus"

Serial Number 09/xxx,xxx, the disclosure of which is incorporated herewith by reference in its entirety.

While the foregoing detailed description has described embodiments of the present invention, it is to be understood that the above description is illustrative only and not limiting of the disclosed invention. For example, other conditions and events may be defined to trigger the assertion of the SYNC_ERROR and/or SYNC_STOP signals. Other modifications may occur to those of skill in this art. Thus, the present invention to be limited only by the claims as set forth below.

What is claimed is:

1. A method of accessing data from a DVD configured to store data in sectors delimited by a sequence of 26 sync patterns, comprising the steps of:

detecting a sync pattern within a sector of the DVD using a 26-state finite state machine;

determining whether the detected sync pattern matches an expected sync pattern;

generating a sync error signal when the detected sync pattern does not match the expected sync pattern;

returning to the detecting step as long as a number of sync error signals does not exceed a predetermined threshold.

2. The method of claim 1, wherein the predetermined threshold is programmable.

3. The method of claim 1, further comprising the step of incrementing a sync error counter each time the sync error signal is generated.

4. The method of claim 3, further comprising the step of resetting the sync error counter when the determining step determines that all detected sync patterns within the sector match the expected sync patterns.

5. The method of claim 3, further comprising the step of resetting the sync error counter when the number of sync error signals generated exceeds the predetermined threshold.

6. The method of claim 3, further comprising the step of resetting the sync error counter when a sync pattern indicative of a beginning of a sector is detected.

7. The method of claim 1, further comprising the step of generating a disk error signal when the number of sync error signals exceeds the predetermined threshold.

8. The method of claim 1, further comprising the step of storing an ordered sequence of sync patterns corresponding to the sync patterns of a sector, each expected sync pattern being read in turn from the stored ordered sequence.

9. The method of claim 1, wherein the sector is a physical sector.

10. An apparatus to access data from a DVD configured to store data in sectors delimited by a sequence of 26 sync patterns, comprising:

a sync pattern detector;

a sync sequence detector including a 26-state finite state machine, the sync sequence generator detecting whether a sequence of sync patterns detected by the sync pattern detector matches the sequence of 26 sync patterns, the sync sequence detector generating a sync error signal whenever a detected sync pattern fails to match an expected sync pattern taken from the sequence of 26 sync patterns;

a sync error signal counter to count a number of sync error signals generated by the sync sequence detector; and a comparator to compare a number of sync error signals counted by the sync error signal counter with a sync error threshold, the comparator generating a disk error signal when the threshold is exceeded.

11. The apparatus of claim 10, further comprising a logic circuit coupled to at least one of the sync sequence generator and the sync signal error counter, the logic circuit generating a sync error signal counter reset signal.

12. The apparatus of claim 11, wherein the logic circuit implements an OR logical function.

13. The apparatus of claim 10, wherein the sync error threshold is programmable by a sync error threshold signal input to the comparator.

14. A DVD controller, comprising:

means for detecting sync patterns from a data stream read from a DVD device;

means for comparing each detected sync pattern with a corresponding expected sync pattern taken in turn from a sequence of 26 sync patterns within a physical sector of a DVD, the comparing means including a 26-state finite state machine;

means for generating a sync error signal whenever the detected and expected sync patterns fail to match; and means for generating a disk error signal when a predetermined number of sync error signals have been generated.

15. The DVD controller of claim 14, wherein the disk error signal includes an interrupt signal.

16. The DVD controller of claim 14, wherein the generating means includes a sync error signal comparator means for comparing a number of sync error signal generated with the predetermined number.

17. The DVD controller of claim 14, wherein the disk error signal generating means also generates a disk error signal whenever a preset number of consecutive sync error signals have been generated.

* * * * *